United States Patent Office 3,004,986
Patented Oct. 17, 1961

3,004,986
PHTHALOCYANINE PIGMENTS
Ben H. Kirby, Lock Haven, Pa., and Samuel E. Getty, Toms River, N.J., assignors, by mesne assignments, to Standard Ultramarine & Color Company, Huntington, W. Va., a corporation of West Virginia
No Drawing. Filed Feb. 8, 1957, Ser. No. 638,921
17 Claims. (Cl. 260—314.5)

This invention relates to the preparation of phthalocyanine pigments.

The usual methods for forming pigments of copper phthalocyanine and hexadecachloro copper phthalocyanine depend on acid pasting or acid milling of the crude base, followed by drowning in water. If the pigmented product is filtered and dried without any further after-treatment, the resulting powder is very hard and bronzy, and when used in paints, varnishes and lacquers or with plastics, the color value, shade and brilliance are reduced to a considerable extent.

To overcome this difficulty, many proposals have been made employing, for example, the use of various surface active agents, after-treatments with rosin soaps, barium lakes, etc. to give products which dry down into soft and fluffy powders and, therefore, can be easily ground into the medium for which they are used as coloring agents.

Although some of these prior processes have the advantage of increasing color strength, they have the disadvantage when used as a full strength toner that the agents employed for after-treatment are retained in the pigment.

Accordingly, it is an object of the present invention to devise an after-treatment agent for phthalocyanine pigments which can be readily removed from the pigment prior to use.

Another object is to prepare phthalocyanine pigments of increased strength.

An additional object is to prepare phthalocyanine pigments having improved dispersion properties.

A further object is to prepare copper phthalocyanine and chloro copper phthalocyanine pigments that can be used as full strength toners.

A still further object is to obtain plastic compositions containing phthalocyanine pigment toners of increased strength even without premixing of the plastic materials and toners.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a pigmented phthalocyanine presscake in conventional manner by acid pasting or acid milling, drowning and filtering and then employing the novel steps of slurrying into water containing a minor amount of an unsubstituted monohydric alcohol having at least three carbon atoms.

In the present specification and claims, all percentages and parts are by weight unless otherwise noted.

The preferred alcohols of the present invention are water insoluble straight and branched chain alkanols having 5 to 12 carbon atoms and the most preferred alcohol is isooctyl alcohol.

Among the alcohols which can be used may be mentioned isopropyl alcohol, commercial mixed amyl alcohols, n-heptanol, lauryl alcohol, n-butyl alcohol, isobutyl alcohol, sec. butyl alcohol, t-butyl alcohol, n-hexyl alcohol, n-octyl alcohol, octanol-2, n-decyl alcohol and cyclohexanol.

As the phthalocyanines, there can be used copper phthalocyanine, chlorophthalocyanines, such as octachloro copper phthalocyanine, dodecachloro copper phthalocyanine and hexadecachloro copper phthalocyanine, aluminum phthalocyanine, hexadecachloro aluminum phthalocyanine, etc.

The preferred phthalocyanines are copper phthalocyanine and hexadecachloro copper phthalocyanine.

The initial acid pasting step is carried out in conventional manner using sulfuric acid of 90% to 100% concentration and in an amount of 3 to 20 parts per part of phthalocyanine. After acid pasting, until the pigment is dissolved or dispersed, e.g., by acid pasting for 1 to 8 hours, the phthalocyanine is drowned in conventional fashion with a large amount of water, e.g., sufficient water to give a sulfuric acid concentration of not over 15% and generally not over 10%. The precipitate is then filtered and the presscake employed as the starting material for the present invention. The presscake usually is about 1 part phthalocyanine and 2 parts liquid, although this can vary from 1 to 3 parts of aqueous liquid per part of phthalocyanine.

The presscake is then treated with a mixture of 4 to 20 parts of water and 0.01 to 0.25 part of the monohydric alcohol per part of phthalocyanine (100% basis). The exact amount of water is not critical as the use of over 20 parts of water does not show any additional advantages. The pigmented phthalocyanine presscake is slurried into the water-monohydric alcohol mixture and stirred at 15–100° C. for a short period of time, e.g., 1 to 3 hours.

The temperature of treatment is not critical. With slow speed agitation higher temperatures should be used, while with higher speed agitation, room temperature is sufficient to give a satisfactory product.

The product obtained by this treatment is then filtered, dried in a conventional air drier and ground to give a soft powder. At the same time, the volatile after-treating agent is evaporated during the drying stage. The soft, easily ground fluffy powder can be employed as a full strength toner in any application.

It has surprisingly been found that the phthalocyanine pigments prepared according to the present invention are especially adapted for use with plastics, e.g., vinyl and vinylidene resins and rubbers such as polyethylene, polyvinyl chloride, vinyl chloride-vinyl acetate copolymer, vinyl chloride-ethyl acrylate copolymer, polystyrene, polymerized methyl methacrylate, polymerized methyl α-chloroacrylate, acrylonitrile resins, and vinylidene chloride resins, natural rubber latex, rubbery butadiene-styrene copolymer, etc. Without any premixing of the plastic materials and the present pigment toners, there is a 25–50% increase in strength over conventional phthalocyanine pigments. This is true even though the toner is reduced in tinting strength by means of titanium dioxide or other white pigments. Generally, .01 to 2 parts of our phthalocyanine pigments are used with 100 parts of plastic.

*Example 1*

Into a flask equipped with an agitator and thermometer were placed 700 parts of water and 180 parts of hexadecachloro copper phthalocyanine presscake (equivalent to 60 parts of the phthalocyanine on a 100% pigment basis). The presscake was obtained by conventional acid pasting with 3.5 parts of 95.2% sulfuric acid per part of the phthalocyanine, drowning in 14 parts of water per part of phthalocyanine and then filtering. Agitation was begun and continued until most of the large particles were broken up and a uniform slurry obtained. Then there were added 1.5 parts of isooctyl alcohol. (The isooctyl alcohol was a mixture of isomeric octyl alcohols prepared by the oxo process and is described more fully in Davie Patent No. 2,732,291, column 4, lines 35–71). The whole mixture was heated with live steam until a temperature of 60° C. was reached and the slurry was held at this temperature for 2 hours. The product was filtered off by suction at the water pump and the flask rinsed with water and the presscake dried at 100° C. in a hot air drier.

The dried material was bright green in appearance and, after conventional grinding through a micropulverizer, the product was ready for use.

Clear, brilliant shades were obtained by using this material in all applications. In plastic applications, it was especially outstanding since it imparted 25–50% more coloring strength than equal amounts of commercially available hexadecachloro copper phthalocyanine pigments.

Example 2

Example 1 was repeated, but the agitation was carried out with a high speed Waring Blendor for a few minutes at room temperature. By this procedure the heating to 60° C. was eliminated. After filtering, drying and grinding, a product was obtained which was equal to the product of Example 1 in all respects.

Example 3

180 parts of copper phthalocyanine presscake (equivalent to 60 parts of phthalocyanine on a 100% pigment content) was slurried in 700 parts of water and treated with 1.5 parts of isooctyl alcohol, as in Example 1. A soft, fluffy, bright blue product was obtained which was excellent for all applications, but was especially outstanding when used for coloring plastics.

Example 4

180 parts of hexadecachloro copper phthalocyanine presscake equivalent to 60 parts (dry basis) of phthalocyanine green presscake prepared by conventional acid pasting, as described in Example 1, was slurried in 500 parts of water containing 1.4 parts of isooctyl alcohol. The whole was heated to 60° C. with stirring and maintained there for two hours, screened through a 200 mesh screen (U.S. standard screen series), filtered, dried and micropulverized. The product was then ready for use with plastics or other conventional applications for phthalocyanine pigments.

For use with polyethylene, a mat of the polymer was formed on a Throp mill. Then, .01 part of the phthalocyanine toner per 100 parts of polyethylene were sprinkled on and milled into the polymer at 135° C. for 12 minutes. The sheets were then molded in a Carver press at 8000 p.s.i. for 10 minutes at 130° C.

Example 5

1 part of phthalocyanine toner prepared in Example 4 was mixed with 54 parts of dioctyl phthalate and placed on the Throp mill with 100 parts of polyvinyl chloride. After heating for 5 minutes at 165° C., the sheet was drawn off.

Polystyrene, various acrylic copolymers and rubber latex were similarly successfully milled with the phthalocyanine pigment.

Tints were observed by addition of titanium dioxide to reduce the color. In a typical example, utilizing the procedure described in Example 4, .01 part of the phthalocyanine green toner and .03 part of titanium dioxide were milled into 100 parts of polyethylene. The same superior strength and shade characteristics were observed as compared to the use of commercially available phthalocyanine pigments similarly diluted with the titanium dioxide.

Example 6

Example 4 was repeated using an equivalent amount of commercial mixed amyl alcohols in place of isooctyl alcohol. The results obtained in polyethylene and polyvinyl chloride were very closely the same as those obtained in Examples 4 and 5 in strength, shade and dispersion properties. In a specific comparison of milling with polyethylene as described in Example 4, the product of Example 6 was a trifle more yellow in shade, a trifle weaker and a trifle worse in dispersion.

Example 7

Example 4 was repeated, but using only one half as much of the isooctyl alcohol. The polyethylene product was a trifle more yellow, a trifle stronger and the dispersion was very slightly inferior.

Example 8

Example 4 was repeated, but using 10 times the amount of isooctyl alcohol. The polyethylene product was a trifle more yellow, had the same strength and the dispersion was slightly inferior. There would be no advantage in using more alcohol.

Example 9

Example 4 was repeated, but using one half the amount of water. The polyethylene product was equal in shade, a trifle weak in strength and a trifle inferior in dispersion properties.

Example 10

Example 4 was repeated, but using twice the amount of water. The polyethylene product was a trifle more yellow in shade and equal in strength and dispersion. Consequently, there would be no advantage in using larger amounts of water.

Example 11

Example 4 was repeated using an equal amount of n-heptanol in place of the isooctyl alcohol. The polyethylene product was a trifle more yellow in shade, equal in strength and a trifle worse in dispersion.

Example 12

Example 4 was repeated except in place of the isooctyl alcohol an equal amount of n-nonanol was used. The polyethylene product was equal in shade, a trifle stronger and equal in dispersion properties.

Example 13

Example 4 was repeated except, in addition to the isooctyl alcohol, an equal amount of wetting agent, specifically, a sodium salt of a condensed sulfonic acid (Tamol N) was used.

The polyethylene product was only about 50% in strength, was too weak to evaluate in shade and had very poor dispersion. This example illustrates the undesirability of having wetting agents present during the process of the present invention.

Example 14

Example 4 was repeated, but using isopropyl alcohol in place of the isooctyl alcohol. The polyethylene product was a trifle more yellow in shade, a trifle stronger and a trifle worse in dispersion properties. While isopropyl alcohol can, therefore, be used, it is to be understood that it is not a preferred alcohol for use in accordance with the present invention. The preferred alcohols are the water insoluble alcohols, and most preferably, are the octanols and nonanols.

Example 15

Example 4 was repeated using an equal amount of lauryl alcohol in place of the isooctyl alcohol. The product was equal in shade, a trifle weaker in strength and slightly worse in dispersion properties. Lauryl alcohol is about the upper limit of the suitable alkanols for the present invention.

Example 16

20 parts of chlorinated copper phthalocyanine (obtained as in Example 2 of Patent No. 2,195,984) and 5 parts of lauryl alcohol were slowly added to 250 parts of sulfuric acid monohydrate as described in Example 5 of Dahlen Patent No. 2,291,452. After stirring until complete solution, the product was drowned into 2500 parts of water at 90–95° C. and worked up as described in the Dahlen patent.

As compared with the polyethylene product obtained in Example 4, a similar polyethylene product using the pigment of Example 16 in the same amount as the pigment used in Example 4 had only about 10% of the color value, was very blue and dull and had very poor dispersion.

Example 17

Example 16 was repeated except that isooctyl alcohol was used in place of the lauryl alcohol. This product was an improvement over that prepared in Example 16, but when milled with polyethylene, gave a product which only was about 30% as strong, was bluer, a trifle duller and showed very poor dispersion as compared to the polyethylene product in Example 4.

A comparison of Examples 16 and 17 with Example 4 illustrates the fact that it is critical to add the alkanol to the presscake after the acid pasting rather than merely adding the alcohol during the acid pasting itself.

Example 18

30 parts of copper phthalocyanine were slowly dissolved in 400 parts of 96% sulfuric acid and stirred until complete solution occurred at 50–55° C. This melt was drowned into 3000 parts of water containing 1000 parts of ice. The precipitate was filtered and washed neutral with water. The filter cake was reslurried in 300 parts of water. 0.84 part of isooctyl alcohol was added, and the whole heated to 60° C. and held there for two hours with stirring. After screening through a 200 mesh screen, the product was filtered, dried and micro-pulverized. This product imparted to polyethylene a strong blue shade having excellent dispersion when used in place of the phthalocyanine green pigment in the polyethylene milling procedure described in Example 4. A similar strong, blue shade was imparted to polyvinyl chloride using the milling procedure described in Example 5.

Example 19

30 parts of copper phthalocyanine and 3 parts of lauryl alcohol were added to 300 parts 98% sulfuric acid containing 3 parts of pyridine at 0–5° C. After stirring to complete solution, the product was drowned into 3000 parts of water at 90–95° C. and worked up according to Examples 1–3 of Dahlen Patent 2,291,452. This product, when tested in polyethylene and polyvinyl chloride blends in the identical manner as in Example 18, had only about 70% of the strength, was redder and duller and had poorer dispersion properties than the product prepared in that example. From a comparison of Examples 18 and 19, it can be seen that with phthalocyanine blue pigments, it is also critical that the alkanol be added after the acid pasting step and not merely during the acid pasting.

Example 20

Example 15 was repeated but, in addition to the lauryl alcohol, there was also added 1.5 parts of pyridine. The polyethylene product was considerably weaker in shade, weaker in strength and worse in dispersion than the corresponding product of Example 15.

We claim:
1. A process consisting essentially of slurrying a phthalocyanine presscake with water containing a minor amount of a member of the group consisting of cyclohexanol and an unsubstituted alkanol having at least three carbon atoms and only one hydroxyl group, said phthalocyanine being selected from the group consisting of copper phthalocyanine, chloro copper phthalocyanine, aluminum phthalocyanine and chloro aluminum phthalocyanine.
2. A process according to claim 1 wherein the phthalocyanine is copper phthalocyanine.
3. A process according to claim 1 wherein the phthalocyanine is chloro copper phthalocyanine.
4. A process of treating a phthalocyanine presscake prepared by acid pasting, said process consisting essentially of slurrying the presscake with a mixture consisting essentially of water containing a minor amount of a water insoluble monohydric alkanol having 5 to 12 carbon atoms, said phthalocyanine being selected from the group consisting of copper phthalocyanine, chloro copper phthalocyanine, aluminum phthalocyanine and chloro aluminum phthalocyanine.
5. A process according to claim 4 wherein the phthalocyanine is copper phthalocyanine.
6. A process according to claim 4 wherein the phthalocyanine is chloro copper phthalocyanine.
7. A process according to claim 6 wherein the phthalocyanine is hexadecachloro copper phthalocyanine.
8. A process according to claim 4 wherein there is used from about 0.01 to about 0.25 part of the alkanol per part of the phthalocyanine.
9. A process according to claim 8, wherein there is added about 4 to 20 parts of water per part of phthalocyanine.
10. A process according to claim 4 wherein the alkanol is isooctyl alcohol.
11. A process according to claim 4 wherein the alkanol is nonanol.
12. A process according to claim 4 wherein the alkanol is heptanol.
13. A process according to claim 4 wherein the alkanol is lauryl alcohol.
14. A process according to claim 4 wherein the alkanol is amyl alcohol.
15. A process according to claim 1 wherein there is used from about 0.01 to about 0.25 part of the alcohol per part of the phthalocyanine.
16. A process according to claim 1 wherein there is added about 4 to 20 parts of water per part of phthalocyanine.
17. A phthalocyanine treated according to the process of claim 1.

References Cited in the file of this patent

UNITED STATES PATENTS

| | | |
|---|---|---|
| 2,296,382 | Fischer et al. | Sept. 22, 1942 |
| 2,316,535 | Bahner et al. | Apr. 13, 1943 |
| 2,327,405 | Davidson et al. | Aug. 24, 1943 |
| 2,367,519 | O'Neal | Jan. 16, 1945 |
| 2,456,274 | Gutzwiller | Dec. 14, 1948 |
| 2,469,663 | Moser | May 10, 1949 |
| 2,489,226 | Morris et al. | Nov. 22, 1949 |
| 2,548,376 | Jones | Apr. 10, 1951 |
| 2,859,219 | Randall et al. | Nov. 4, 1958 |